(12) United States Patent
Viroli et al.

(10) Patent No.: US 11,617,234 B2
(45) Date of Patent: Mar. 28, 2023

(54) INDUCTION HOB WITH BOILING DETECTION AND INDUCTION ENERGY CONTROL, METHOD FOR HEATING FOOD WITH AN INDUCTION HOB AND COMPUTER PROGRAM PRODUCT

(71) Applicant: Electrolux Appliances Aktiebolag, Stockholm (SE)

(72) Inventors: Alex Viroli, Forli (IT); Laurent Jean-Neteau, Forli (IT); Massimo Nostro, Forli (IT); Svend-Erik Christiansen, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 746 days.

(21) Appl. No.: 15/509,073

(22) PCT Filed: Aug. 4, 2015

(86) PCT No.: PCT/EP2015/067901
§ 371 (c)(1),
(2) Date: Mar. 6, 2017

(87) PCT Pub. No.: WO2016/041684
PCT Pub. Date: Mar. 24, 2016

(65) Prior Publication Data
US 2017/0245327 A1 Aug. 24, 2017

(30) Foreign Application Priority Data
Sep. 18, 2014 (EP) ..................... 14185254

(51) Int. Cl.
*H05B 6/06* (2006.01)
*G05D 23/19* (2006.01)

(52) U.S. Cl.
CPC ......... *H05B 6/062* (2013.01); *G05D 23/1919* (2013.01); *H05B 2213/04* (2013.01); *H05B 2213/05* (2013.01); *H05B 2213/07* (2013.01)

(58) Field of Classification Search
None
See application file for complete search history.

(56) References Cited

U.S. PATENT DOCUMENTS

| 4,869,233 A | * | 9/1989 | Stulen | ...................... A47J 27/62 126/374.1 |
| 6,118,104 A | * | 9/2000 | Berkcan | ............... H05B 1/0269 219/481 |

(Continued)

FOREIGN PATENT DOCUMENTS

| EP | 2020826 A1 | * | 2/2009 | ............. H05B 6/062 |
| EP | 2020826 B1 | | 3/2013 | |

(Continued)

OTHER PUBLICATIONS

International Search Report and Written Opinion issued in PCT/EP2015/067901 dated Sep. 2, 2015, 11 pages.

(Continued)

*Primary Examiner* — Ibrahime A Abraham
*Assistant Examiner* — Elizabeth M Kerr
(74) *Attorney, Agent, or Firm* — Pearne & Gordon LLP

(57) ABSTRACT

An induction cooking hob and a method for heating food as well as a computer program product are disclosed. Based on information of a micro-electromechanical system (1500) in combination with a temperature sensor associated to a heating zone, vibrations can be detected and a heating zone associated with the boiling substance can be properly discriminated from one supporting a pot having a non-boiling substance in it. Subsequent simmering of the substance can be automatically effected. An indication will be provided to a user (1680), and an automated function can be started (Continued)

(1610) including boiling and subsequent simmering, respectively indication of a boiling substance on any of the heating zones on an induction hob (1000).

4 Claims, 3 Drawing Sheets

(56) References Cited

U.S. PATENT DOCUMENTS

| | | | | |
|---|---|---|---|---|
| 6,236,025 | B1* | 5/2001 | Berkcan | G05D 23/27535 219/483 |
| 9,027,469 | B2* | 5/2015 | Smrke | G05D 23/27535 99/342 |
| 9,354,207 | B2 | 5/2016 | Buendia Garcia et al. | |
| 9,395,078 | B2* | 7/2016 | Buendia Garcia | F23N 5/242 |
| 9,675,199 | B2 | 6/2017 | Buendia Garcia et al. | |
| 2009/0173731 | A1* | 7/2009 | Nagamitsu | H05B 6/062 219/622 |
| 2011/0147371 | A1* | 6/2011 | Cho | H05B 6/062 219/620 |

FOREIGN PATENT DOCUMENTS

| | | | |
|---|---|---|---|
| EP | 2590473 | A1 | 5/2013 |
| JP | 2005019292 | * | 1/2005 |
| JP | 2005019292 | A | 1/2005 |
| JP | 2005129239 | A | 5/2005 |

OTHER PUBLICATIONS

Brazillian Office action for application No. BR112017004489-7 dated Nov. 1, 2022, 5 pages.

* cited by examiner

INDUCTION HOB WITH BOILING DETECTION AND INDUCTION ENERGY CONTROL, METHOD FOR HEATING FOOD WITH AN INDUCTION HOB AND COMPUTER PROGRAM PRODUCT

In modern lifestyle, time is rare and the efficient use of available time is of essence. In household environments, such as kitchen environments, people want to have the utmost freedom in the preparation of their food, while at the same time expecting a sophisticated level of automation and security in order to guarantee and safeguard an optimum cooking result. Manufacturers of kitchen hobs thus strive to develop automated cooking functions to a higher degree while using dedicated sensor technology combined with sophisticated control mechanisms. On the other hand, kitchen hobs, such as induction hobs, for kitchen environments and for a mass market have to be cost-efficient and reliable to guarantee a long-term functionality expected of the kitchen appliances.

Document EP 2020826 B1 discloses an induction heating cooker, an induction heating cooking method and an induction heating cooking program. According to this document, a vibration sensor based on piezoelectric ceramics is used to detect vibrations caused by sound waves in the ultrasonic frequency range of about a double the induction frequency.

One embodiment shown in FIG. 11 shows two pots on the two heating zones equipped with individual thermistors to detect a temperature of a bottom surface of a cooking vessel. Vibration detection is commonly performed by a single vibration sensor. In order to detect in the example shown in FIG. 11, which of the two vessels contains a boiling substance, the induction power supplied to the respective induction coils is manipulated according to a pattern, and if a corresponding vibration pattern is discovered by the vibration sensor, the respective boiling substance and the associated cooking zone is identified.

Document JP 2005129239 A discusses a heating cooker in which it is easy to identify a heating means of boiling in the case either of the containers placed respectively on a plurality of heating means comes to a boil. In the heating cooker provided with a top plate capable of placing a container in which a heated material is put, and a plurality of heating means composed of at least one induction heat coil and an electric heater arranged and installed respectively at the lower part of this top plate, this is equipped with a vibration detecting means to detect vibrations of the container via the top plate, a boiling detecting means to detect a boiling state of the heated material by an output from this vibration detecting means, and a boiling judgment means to identify the boiling heating means from a vibration damping ratio of a container corresponding to respective heating means after termination of heating by boiling of the heated material.

According to document U.S. Pat. No. 6,236,025 B a cooking range with an acoustic sensing system for determining the boil state of the contents of a cooking utensil includes at least one acoustic sensor, is positioned on or in the cooking appliance to detect acoustic emissions in one or more specific ranges of frequencies that are characteristic of emissions resulting from the heating and boiling of liquids in a variety of cooking utensils or vessels.

According to document JP 2005019292 to eliminate a trouble such as misunderstanding by a user, a heating cooker comprises a heating cooker body provided with a top plate for mounting a heating vessel on the upper part, a heating means for heating and cooking a heated object in the heating vessel, a vibration sensor for detecting the level of vibration transmitted to the heating cooker body, a temperature sensor for detecting the temperature of the top plate, and a boiling detection means which detects the boiling state of the heated object in the heating vessel based on the output of the vibration sensor, and on the condition that the detected temperature of the temperature sensor is a prescribed temperature or higher, finally decides the boiling detection of the heated object.

According to EP 2590473 A a cooking device has heating unit, a control unit and sensor unit. The control unit is provided for detecting the imminent simmering state of food to be cooked by the heating unit, based on the time profile of a signal measured by the sensor unit. An acceleration sensor is provided in the sensor unit. A position determination of heated cooking material is performed based on corresponding signal strength of the signals.

Document U.S. Pat. No. 6,118,104 A discusses a method of determining the boil states of a liquid as measured by an acoustic sensor which measures the acoustic signal generated by the liquid as it is heated. The acoustic signal is smoothed and a first derivative of the acoustic signal is calculated. Also the frequency of the acoustic signal is measured. Derivative inflection points, zero slope points, and acoustic signal frequencies are utilized to determine the pre-simmer, simmer, pre-boil, boil, boil dry, and boil over states of the liquid.

No further prior art is known.

The invention is based on the problem to improve boiling detection for a cooking hob in the presence of more than one cooking vessel and subsequent energy control for an induction hob.

This problem is solved by the invention by an induction hob according to claim 1, a method for heating food according to claim 11 and a computer program product for an induction hob according to claim 15.

Further developments of the invention are given in the dependent claims.

Advantageously, an induction hob according to the present invention uses a micro-electromechanical system, also named MEMS, respectively an acceleration sensor to detect vibrations caused by bubbles forming inside of a heated substance, thereby making use of a widely distributed technology in mobile devices that is available in large quantities and has proven to be reliable. It combines this with respective temperature detectors in order to determine which of the substances being heated on the induction hob are boiling and controlling the energy supplied to the induction coil heating the respective identified substance in a manner to avoid overcooking and allow continuous simmering in an automated process.

Advantageously, according to a further development of an embodiment of the kitchen hob according to the present invention, the micro-electromechanical system e.g. as a vibration sensor is placed between heating zones, and in this manner vibrations caused by substances boiling on any of the heating zones around a vibration sensor can be detected with substantially equal sensitivity and thus only one vibration sensor in the center can be used for a plural heating zones in order to securely detect boiling substances cooking on the respective heating zones.

Beneficially, according to a further development of an embodiment of the kitchen hob according to the present invention, the micro-electromechanical system, respectively the vibration- or acceleration sensor, is placed in the middle between cooking zones, because in this manner vibrations caused by substances heated on respective cooking zones have to travel the same distance to the vibration sensor and thus allow a precise detection of vibrations with the same sensitivity regardless which cooking zone is involved. In this manner, the detection of cooking substances is further facilitated and improved. This allows establishing the same accuracy in the determination for all of the cooking zones.

Advantageously, according to a further development of an embodiment of the kitchen hob according to the present invention, the micro-electromechanical system respectively acceleration sensor, vibration sensor is attached to a cooking plate which also houses the cooking zones of the induction cooking hob. In this manner, the vibration distribution to the acceleration sensor is facilitated, while at the same time allowing for minimum damping effects and thus improving the accuracy. Isolating the micro-electromechanical system from magnetic waves or an electric field present or caused by the operation of the induction hob by a dielectric medium protects the device and ensures a long-term function of the acceleration sensor. Beneficially at the same time a better heat isolation is also provided. In this manner the micro-electromechanical system is better protected against thermal shock or overheating in case a hot pot is placed in its proximity.

Beneficially, according to a further development of an embodiment of the kitchen hob according to the present invention, the dielectric medium is mica which is a hard substance and thus allows for the distribution of sound and vibration energy, while at the same time protecting the micro-electromechanical system from damage by an electric field or magnetic waves respectively radiation present at an induction hob. Advantageously mica has also good thermal isolation properties and thus is capable of providing double protection to the micro-electromechanical system.

Advantageously, according to a further development of an embodiment of the kitchen hob according to the present invention, a user interface is provided at the kitchen hob that is connected to a control unit and adapted to indicate a boiling state of a substance on any of the cooking zones to a user. In this manner, a rapid response by a user can be triggered, respectively the awareness of an operator can be attracted in order to provide closer control of the cooking process and eventually take corrective measures not withstanding automated functions of the induction cooking hob.

Advantageously, according to a further development of an embodiment of the kitchen hob according to the present invention, the controller is adapted to control the energy supplied to the induction heating zone to keep the boiling substance simmering. This means that the energy supplied to the respective induction coil associated to the identified heating zone, which supports the boiling substance will be reduced in a manner to avoid boiling, while at the same time keeping the boiling substance in a simmering state associated to a predetermined cooking temperature.

Advantageously, according to a further development of an embodiment of the induction hob according to the present invention, the controller is adapted to control the power supplied to the identified heating zone based on a vibration- respectively sound level at an initial cooking state and a maximum sound level. In this manner, a power level can be calculated that corresponds to a certain temperature by taking the total power into account and the relationship of the total sound volume to the sound volume at a simmering state. Herewith, an easy and simple method is provided in order to calculate the power required to keep a previously boiling substance in a simmering state.

Advantageously, according to a further development of an embodiment of the induction hob according to the present invention, the power supplied to the identified heating zone is determined based on a heating behavior of the substance to be boiled. Based on the power supplied to the heating zone and the time needed for the substance to boil, roughly a mass of a substance can be calculated taking water as a basis. In this manner, the power required to keep the substance on a heating zone at a simmering state can be well approximated by taking any previous made observations with different masses into account and e.g. looking up the power required for simmering in a mass /power table stored e.g. in the controller.

Advantageously, according to a further development of an embodiment of the induction hob according to the present invention, a user interface is provided with a start button for an automated process involving pot detection on a heating zone, boiling of a substance in the pot detected on a heating zone and subsequent simmering of the heated substance. In this manner, with a minimum of user interaction required, substances in various pots on the induction hob according to the present invention can be boiled and subsequently simmered according to a predetermined finished cooking state. Beneficially, such a process can be combined with predefined timings for respective heating zones.

Advantageously, according to a method for heating food according to the present invention, vibrations caused by audible sound during heating of a heated substance on different heating zones of an induction hob can be measured, and signal analysis of sound over time can be performed in order to securely determine once a boiling state is reached. Subsequently power supplied to the heating zone, which supports the boiling substance can be controlled, e.g. in a manner to simmer the substance after boiling, or an indication can be provided in order to allow a user to respond to the substance boiling by taking appropriate control measures or e.g. putting the noodles into the boiling water.

Advantageously, an indication of boiling can be given, once a peak sound level to a current sound level relationship is 0.4.

Advantageously, another determination of a boiling state can be provided by a further development of an embodiment of the method according to the present invention in determining a flat slope of a sound level that is higher than an initial sound level for a period of 30 seconds.

Advantageously, according to a further development of the method according to the present invention, a power supplied to a heating zone is reduced based on a relationship of a maximum sound level to a sound level expected to occur at a simmering state and adjusting the power accordingly or determining the temperature gradient during heating, corresponding to a mass of substance to be heated. This allows to determine a power required to keep the substance at a simmering state, advantageously by looking up the power in a table listing masses and required heating power for simmering.

Advantageously, a computer program product for an induction hob according to the present invention comprises computer-readable instructions stored on a memory that when read by a controller of the induction hob makes the controller execute method steps according to the present invention as process steps. In this manner, mass production is facilitated and an easy update of controller software at a customer site is possible wirelessly or per reader transferring the instructions from a maintenance terminal or the like to the controller at the customer's premises.

Subsequently, the invention will further be explained on the basis of examples shown in drawings, wherein.

Figure 1:
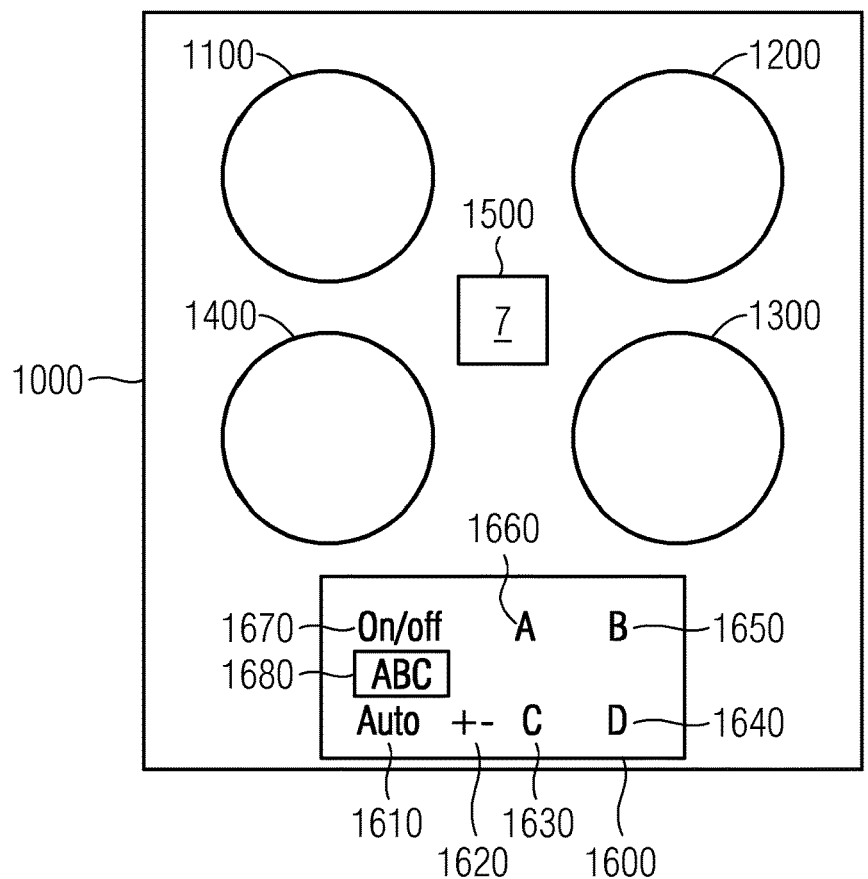
FIG. 1 shows an exemplary top view on a kitchen hob.

As FIG. 1 shows, an induction hob 1000 has for instance four heating zones 1100, 1200, 1300 and 1400. A vibration sensor, built as e.g. accelerometer, respectively a micro-electromechanical system 1500, is located between the heating zones and preferably in the middle of them in order to detect vibrations caused by audible sound when substances are boiling on respective heating zones with the same accuracy.

For better protection the micro-electromechanical system may be mounted on a printed circuit board. In this way it may be better protected against heat and excess vibration. Further, in case the mounting location is closer to a magnetic coil a magnetic shield may preferably be provided beneficially a metal shield. The printed circuit board beneficially may be coupled to a glass ceramic by mechanic means such as a pin or walls. On the other hand the printed circuit board beneficially may be mounted on a soft material e.g. silicone fixing it to a cooktop to limit the vibration transmission from the glass ceramic to the micro-electromechanical system. In this manner the life span of the micro-electromechanical system can be prolonged.

Further, a human interface 1600 is shown that allows to respectively select the heating zones 1100 to 1400 by corresponding switches 1660 to 1630. Further, an on/off switch 1670 is provided as well as an indication 1680 and a button 1610 for an automated function. Further, a +/− switch is shown 1620 in order to e.g. regulate the power provided to the respective heating zones 1100 to 1400 when no automated function is running, or in order to correct the power during an automated process. The indicator 1680 can be, for instance, a text display, an optical display such as a light-emitting diode or contain a speaker in order to provide an audible sound in case a state achieved by a substance on the induction hob needs the attention of the user, for further input or performing activities with cooking substances. For instance, a boiling state of a cooking substance on any of the heating zones 1100 to 1400 may be indicated on the indicator 1680. With the automatic function button, which can be e.g. a sensor field or touchscreen input as well, a user may start an automated boiling function on any of the heating zones of the induction hob 1000. For instance, a user may place a cooking vessel such as a pot on one of the heating zones which will be recognized by a pot detection—not shown—of the induction hob and lead to subsequent boiling of the substance, where a boiling state is detected by use of the micro-electromechanical system 1500, and a subsequent simmering of the substance may be started after the boiling state has been reached.

Further, once the boiling state is reached, an indication may be given via the indicator 1680 by presenting a flashing light, a text message or an audible sound or a combination thereof. The same automated function is conceivable for plural pots placed on different heating zones.

Figure 2:
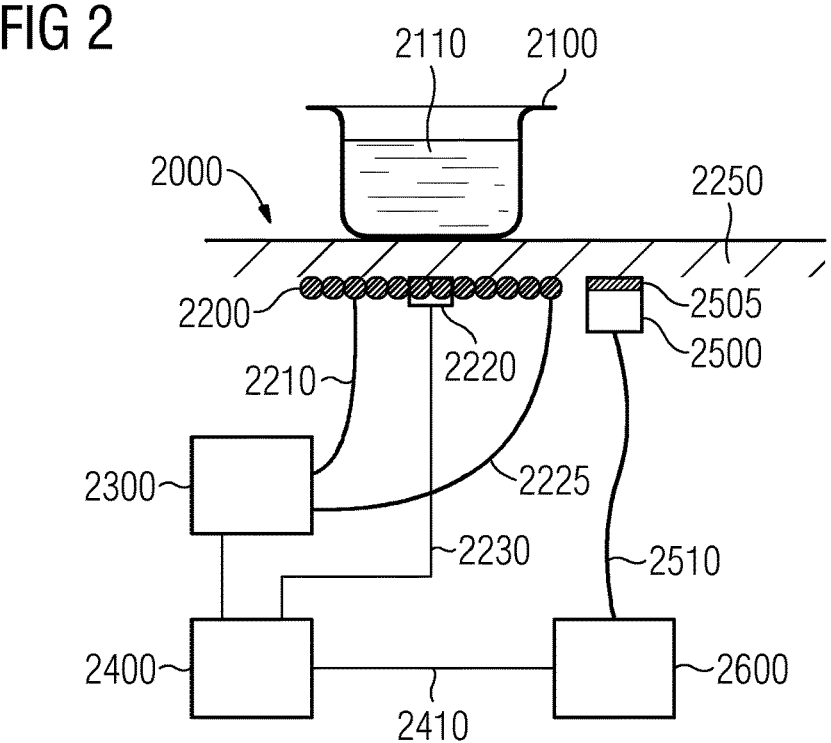
FIG. 2 shows a configuration of a kitchen hob.

FIG. 2 shows a basic configuration of a kitchen hob according to an embodiment of the present invention. In this case, this may be considered as a preferred embodiment of the invention. The inventors have found that in the presence of plural boiling substances on a kitchen hob, a boiling substance can be securely identified by a combination of a thermal sensor and a micro-electromechanical system, e.g. respectively an acceleration sensor. Here, a pot 2100 is shown containing a cooking substance 2110, e.g. water or a soup or any other dish. Also shown is a cooktop 2250 which supports the pot 2100 above a heating zone. The heating zone is exposed to magnetic waves emanated from an induction coil 2200 located underneath the cooktop 2250. Electric fields may build up during the operation of the induction hob. Located in the area of the cooking zone is a thermal sensor 2220, such as a thermostat providing information about a temperature in its area. Further, a generator 2300 of magnetic waves is shown that is connected to a controller 2400, which controls the signals and the energy of the signals generated by the generator 2300.

Further, a user interface controller 2600 is shown, which is connected to the controller via a line 2410 and to the vibration sensor 2500, respectively micro-electromechanical system, respectively accelerometer 2500 via a line 2510. Once the induction coil 2200 is fed with magnetic energy from the generator 2300, eddy currents are generated within the cooking vessel 2100, and the substance 2110 is heated by the heated vessel. In addition an electric field may build up that may cause damage to sensitive electrical parts such as an MEMS.

At a certain point in time, bubbles start to form inside of the substance 2110 and collapse again, which leads to vibrations and audible sound. This sound is detected by the micro-electromechanical system 2500. Here, it is shown that the micro-electromechanical system 2500 is attached to the cooktop 2250 indirectly via a dielectric shield 2505, which may be made of mica, as this is a hard substance and does not substantially dampen vibrations, while at the same protecting the micro-electromechanical system from electromagnetic waves emanated from the induction coil 2200 or an electric field that builds up or is present during operation or at the induction hob. Beneficially the mica also at the same time provides good thermal isolation against heat transmitted from e.g. a hot pot through the cooktop 2250 e.g. being made from glass ceramics.

Instead of the mica or in addition to it for better protection the micro-electromechanical system may be mounted on a printed circuit board. In this way it may be better protected against heat and excess vibration. Further, in case the mounting location is closer to a magnetic coil a magnetic shield may preferably be provided beneficially a metal shield. The induction coils also beneficially may be designed to direct the electromagnetic waves away from micro-electromechanical system. The printed circuit board beneficially may be coupled to the cooktop 2250 by mechanic means such as a pin or a wall. On the other hand the printed circuit board beneficially may be mounted on a soft material e.g. silicone to limit the vibration energy transmission from the glass ceramic to the micro-electromechanical system. In this manner the life span of the micro-electromechanical system can be prolonged.

The induction hob according to the embodiment may be configured in a way that plural substances can be synchronously heated on the cooktop 2250 and each heating zone is provided with a thermal sensor 2220, while preferably only one micro-electromechanical system e.g. needs to be provided to detect vibrations caused by an audible sound emanated from all substances heated on all of the heating zones indicated by 1100 to 1400 in FIG. 1.

Once the boiling of a respective substance is detected, consulting the respective temperature sensor indicating the highest temperature, the respective heating zone can be identified and corrective measures in order of controlling power supplied to the induction coil 2200 can be taken, preferably in a manner that the power supplied to the induction coil 2200 is lowered in order to allow a simmering of the previously boiled substance for a predetermined amount of time.

Usually, a micro-electromechanical system is a device that is also used in mobile phones and is widely available and reliable and maybe used in a cost-efficient manner as a mass market device for household appliances.

On the other hand, it is conceivable that a micro-electromechanical system as part of a mobile device is used di-rectly by putting a mobile phone on the cooktop 2250 and allowing it to communicate with the controller 2400 or 2600 via near field communication or any other wireless suitable communication. In such a case, the micro-electromechanical system 2500 would not be required. On the other hand, if this is the case, the indicator could alarm a user to put his mobile phone on the cooktop in order to allow the automated function to be performed. The micro-electromechanical system 2500 may be part of an accelerometer subsystem which prepares signals detected by the micro-electromechanical system for communication to the controller 2400.

Beneficially, the accelerometer subsystem is placed in contact with the cooktop and protected by a shield of a dielectric layer beneficially made from 1 mm of mica in order to detect acceleration variations due to vibrations caused by audible sounds of a pot 2100, the shield may extend sufficiently over the micro-electromechanical system in order to protect it from an electric field or disturbances caused be magnetic waves. Beneficially, it may be glued to the cooktop 2250 from underneath. Instead or in addition a printed circuit board can be used for mounting and better protection of micro-electromechanical system as described above.

Beneficially, according to the present invention, an automated function started e.g. by a button 1610 shown in FIG. 1, detects or starts any pot and a related heating zone on the induction hob containing a boiling substance and indicates a boil detection to a user through the human interface 1600 shown in FIG. 1; and after a suitable amount of time reduces the power supplied to the respective heating zone to maintain the substance simmering. A micro-electromechanical system has the advantage that it has no inertia which provides for a speed advantage over temperature sensors as the heat generated in the boiling substance and in the pot 2110, 2100 needs to be transmitted from the pot through the cooktop 2250 to the temperature sensor 2220.

Figure 3:
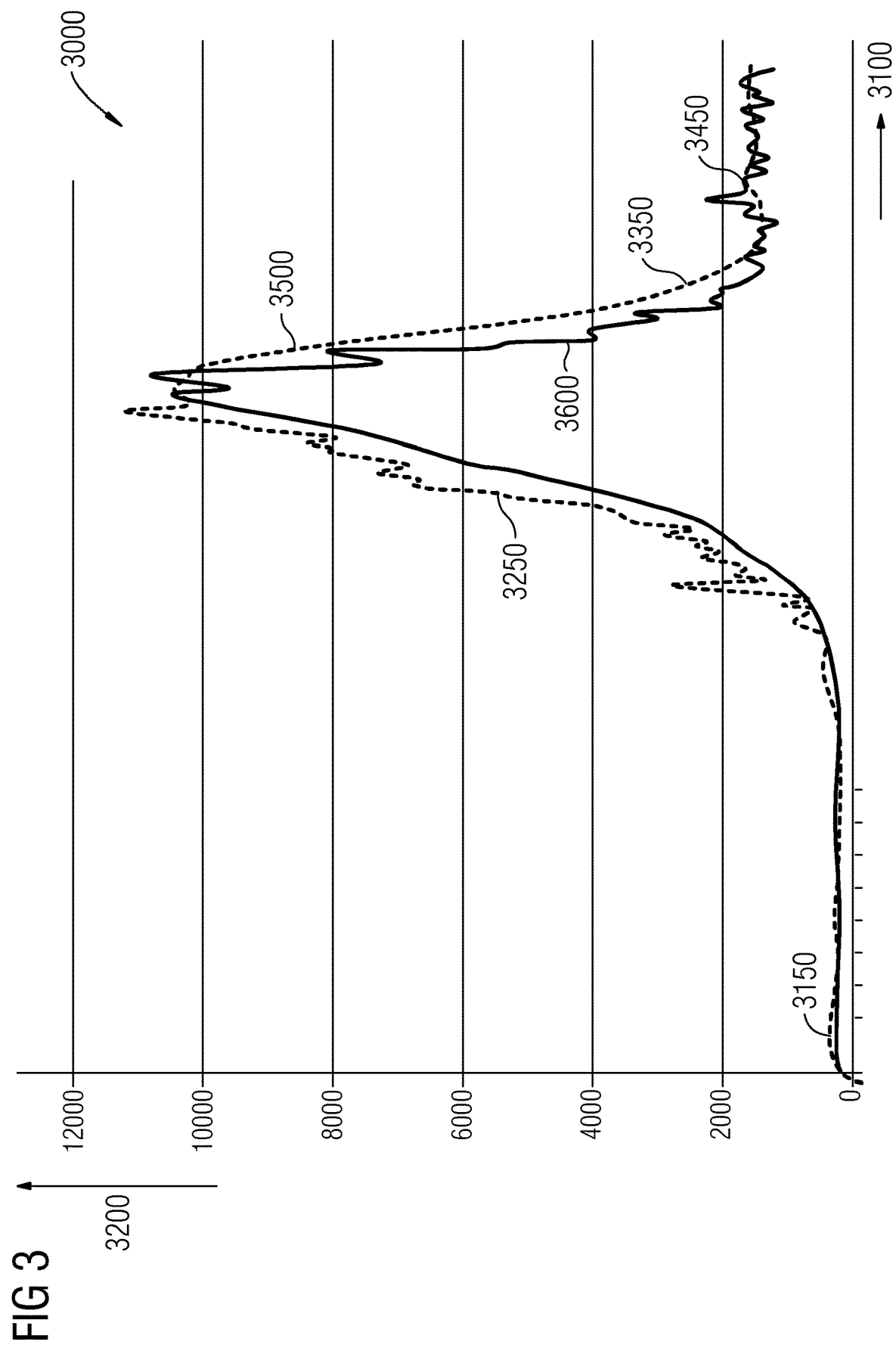
FIG. 3 shows a vibration curve over time.

FIG. 3 shows a vibration curve over time during a heating of a substance on an induction hob according to an embodiment of the present invention, e.g. a configuration according to FIG. 2 may be used to generate this diagram.

Upward, a sound level 3200 is indicated, and to the right the time 3100 is indicated. In an initial state, energy is switched on, e.g. by putting a pot on the induction hob, detecting the presence of the pot and pushing the auto button 1610 on the hob.

Then, power is supplied to an induction coil in order to heat the pot and the substance within the pot by generating eddy currents in the conducting material of the pot. At this stage 3150, almost no audible sound is generated and the vibrations associated to audible sound generally stay at a lower level. In this context, it is assumed that the energy supplied to the induction coil is constant. It may be a maximum power or it may be a special heat-up configuration power or it may be any desired energy level associated and suitable to a cooking process.

At a certain point in time, a positive gradient can be determined indicating a pre-boil phase at 3250. Later, a maximum will be passed and a negative gradient of the vibration curve can be detected. At 3250, a boil starting phase is indicated. 3500 refers to a filtered curve, whereas 3600 refers to a measured curve. For instance, a signal measured by a micro-electromechanical system may be subject to fast Fourier transform to transform it to a frequency power spectrum and to filter unwanted frequencies that have no origin in the cooking process. Also frequencies originating of mains harmonics can be filtered out.

Further, in order to improve the signal quality, a low-pass filter can be used in order to further sort out signals that are not related to a cooking process. The filtered curve is shown at 3500.

Beneficially, according to a method of the present invention, plural parallel algorithms can be carried out on the signal which improves the possibility and the likelihood to securely detect a boiling stage under various conditions with different pots, different substance levels and different power levels.

Beneficially for every signal, it is detected and stored a signal history in the form of e.g. different steps: detecting a positive slope, a negative slope, a peak, an initial level and subsequent evaluation of conditions and refining the gained information for decision making to securely attribute cooking stages such as in particular boiling and simmereing. Here, this means that e.g. certain conditions at a certain time are determined and stored for further evaluation.

Advantageously, plural algorithms can be performed, e.g.
1) a detection of a maximum peak and subsequent descent may be performed. It is e.g. known that boiling happens at the back edge of the peak in an ideal case. Accordingly, boiling can be detected securely and in an easy fashion, if such a peak with a subsequent descent of the signal can be detected. A boil detection signal can be generated, for instance when a certain relationship between the maximum signal strength and a subsequent signal is achieved, e.g. preferably a relationship of 0.4 is sufficient to indicate that boiling took place. In this case, the signal can be used to generate information in form of text as visible or audible information indicated at the human interface.

Further steps can be performed in case a secure determination according to 1) is not possible. In this case, beneficially, another determination
2) can be performed wherein a flat slope of the vibration level is detected, which is, however, determined to be higher than an initial level of the vibration. Flat means that the level substantially stays the same over a time period and only e.g. differs 5% or 10%. The states correspond to 3450 for the high level and to 3150 for the lower level at the initial stage. Such a detection can be further improved by combining it with a previous detection of a small peak, respectively a negative slope.

On the other hand, if the methods according to 1) and 2) do not lead to a secure detection, a further detection
3) can be performed which is solely based on the detection of a flat slope at a final higher level and a lower level at an initial state 3150. In this case, it might be beneficial to use a longer observation period e.g. preferably 20 seconds or more preferably 30 seconds until a signal for boiling detection is generated to improve the security of the detection.

Beneficially, according to embodiments of the present invention, vibration detection is combined with temperature detection. Induction hobs are usually equipped with a zone temperature sensor that is conventionally measuring a temperature comprised of a mix of the cold temperature, glass/pot temperature and induction magnetic field. As a consequence of this mix of measurements, the sensor information of such a temperature alone is usually not suitable to give a precise indication of a boiling point.

Beneficially, the determination of boiling in a substance based on vibrations and a micro-electromechanical system has a higher priority than the determination based on a temperature sensor. However, the temperature sensor can be used in case of plural fluids or substances are boiling on different heating zones and in case a boiling indication signal is generated by the generator respectively the user interface controller in order to allocate the proper heating zone. In this case, the heating zone having an associated thermal sensor indicating a higher temperature is determined to support the pot containing a boiling substance, and a corresponding indication is given on the indicator 1650.

Beneficially, respective temperature sensors 2220 can further be used to increase the detection reliably by e.g. starting the evaluation algorithm only once a cooking zone has reached a certain temperature. Further, the detection can be stopped, if e.g. an unusual unexpected temperature is indicated by a temperature sensor associated to a heating zone.

In an automated cooking process according to an embodiment of the method according to the present invention, and subsequent to a detection of a boiling state in a substance contained in a pot on a heating zone, energy supplied to an induction coil associated to that heating zone can be reduced in a manner to keep the food in the pot at a simmering state. A power level at this state properly supplied to the induction coil can be determined in various ways. For instance, a level of vibrations registered at an initial level 3150 in FIG. 3 can be compared with a vibration level at strong boiling, e.g. at 3450 shown in FIG. 3.

A simmering power level can e.g. be adjusted relative to these two levels in order to achieve a simmering level corresponding to a vibration level scaled in between these two levels. Proportionally, associated power levels will be used to determine the corresponding simmering level. On the other hand, in case where a temperature sensor indicates that a boil detection has been based on cooking started from a cold state, a time can be measured from a cold state and an amount of water respectively cooked substance can be estimated from the time and integrated power derived by measuring the time under constant respective power until boiling takes place. This allows to determine the amount of water and correspondingly allows to associate an amount of energy to be provided to this substance in order to keep it at a simmering state by e.g. providing a table that allocates a certain energy to a certain mass of substance to be cooked and looking the required energy needed for the respective mass up in the table.

Figure 4:
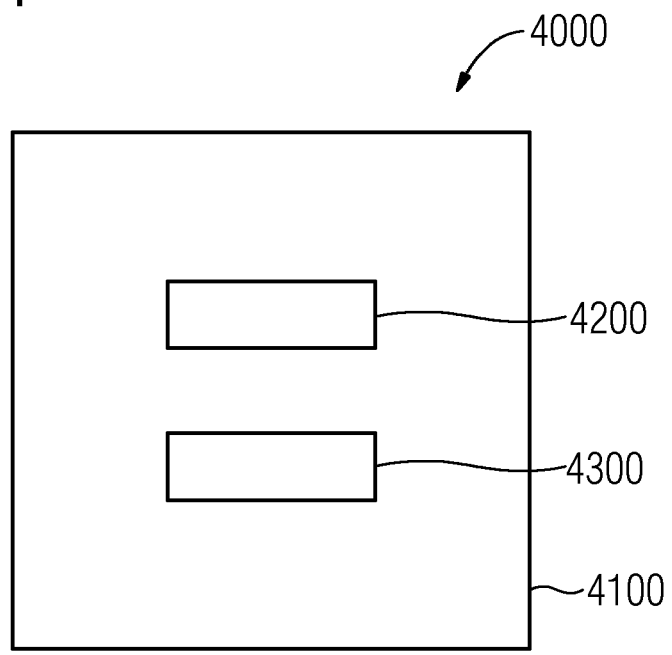
FIG. 4 shows a computer program product.

As FIG. 4 shows, a computer program product 4000 is comprised e.g. of a data carrier, such as a storage card 4100 and instructions 4200 respectively 4300 stored on the storage card 4100. For instance, these instructions can be read by a controller 2400 in an induction hob and cause it to perform boiling detection, calculation of energy to be required for simmering and control of cooking zones as explained above.

LIST OF REFERENCE NUMERALS

1000: induction hob;
1100, 1200, 1300, 1400: heating zones;
1500: vibration sensor, accelerometer, micro-electromechanical system;
1600: human interface;
1630, 1640, 1650, 1660: selectors for heating zones;
1670: on/off switch;
1610: automated function switch;
1680: indicator;
2000: induction hob configuration;
2100: pot;
2110: cooking substance;
2250: cooktop;
2200: induction coil;
2300: induction generator;
2400: controller;
2410: connecting line;
2600: user interface controller;
2510: connecting line;
2220: thermal sensor;
2230: connecting line;
2210, 2220: lines for feeding power to induction coil;
2500: accelerometer subsystem respectively micro-electromechanical system;
2505: dielectric shielding material;
3000: vibrations over time chart;
2200: vibrations;
3100: time;
1330: initial stage;
3250: pre-boil stage;
3350: boil start stage;
3450: boiling stage at a higher vibration level 3150;
4000: computer program product;
4200, 4300: computer-readable instructions;
4100: data carrier.

The invention claimed is:

1. A method for heating food, comprising:
heating food on a first heating and a second heating zone;
measuring audible sound vibrations during the heating of food on both the first heating zone and the second heating zone;
transforming the audible sound vibrations to a frequency power spectrum;
measuring a temperature associated to the first heating zone;
detecting a maximum vibration level in the measured audible sound vibrations over time;
independently detecting a flat slope vibration level;
the aforementioned detecting steps being started only once the first heating zone has reached a pre-determined temperature;
identifying the first heating zone based on information from a temperature sensor indicating a higher temperature at the first heating zone and the independently detected flat slope vibration level; and
indicating a boiling state at the first heating zone when the detected flat slope vibration level is higher than an initial vibration level for 20-30 seconds.

2. The method according to claim 1, wherein the power supplied to the identified heating zone is reduced:
(i) based on a sound level relationship between an initial state when the initial vibration level is detected and a boiling state, or
(ii) based on a temperature gradient determined over time; leading to a determination of the mass to be heated.

3. The method according to claim 2, wherein after the power supplied to the identified heating zone is reduced, the power supplied to the identified heating zone is then controlled to maintain the heated food in a simmering state.

4. The method according to claim 2, wherein after the power supplied to the identified heating zone is reduced, the power supplied to the identified heating zone is then controlled to maintain a simmering vibration level that is less than the flat slope vibration level.

\* \* \* \* \*